United States Patent [19]

Lee

[11] Patent Number: 4,558,085

[45] Date of Patent: Dec. 10, 1985

[54] PROCESS FOR THE PREPARATION OF FAST CRYSTALLIZING POLYALKYLENETEREPHTHALATE RESIN COMPOSITIONS

[75] Inventor: Chung J. Lee, Clifton Park, N.Y.

[73] Assignee: Plastics Engineering Company, Sheboygan, Wis.

[21] Appl. No.: 642,343

[22] Filed: Aug. 20, 1984

Related U.S. Application Data

[62] Division of Ser. No. 540,366, Oct. 11, 1983, abandoned.

[51] Int. Cl.$^4$ .............................................. C08L 67/02
[52] U.S. Cl. .................................... 524/299; 524/315; 524/318; 524/368; 524/394; 524/449; 524/456; 524/539; 524/605; 525/166; 525/408; 525/437; 525/425
[58] Field of Search ............... 525/408, 437, 166, 425; 524/394, 368, 299, 315, 318, 449, 456, 539, 605

[56] References Cited

U.S. PATENT DOCUMENTS

| | | | |
|---|---|---|---|
| 3,761,450 | 9/1973 | Herwig | 528/296 |
| 3,957,706 | 5/1976 | Light | 524/394 |
| 4,215,032 | 7/1980 | Kobayashi | 525/437 |
| 4,276,208 | 6/1981 | Ogawa | 524/605 |
| 4,322,335 | 3/1982 | Nield | 523/522 |
| 4,344,874 | 8/1982 | Akagi | 524/296 |
| 4,351,751 | 9/1982 | Kishida | 524/375 |
| 4,352,904 | 10/1982 | Deyrup | 524/292 |
| 4,362,839 | 12/1982 | Tonoki | 524/513 |
| 4,393,178 | 7/1983 | Legras | 525/437 |

*Primary Examiner*—John C. Bleutge
*Assistant Examiner*—Patricia Short
*Attorney, Agent, or Firm*—Walter J. Monacelli

[57] ABSTRACT

The fast crystallizing polyalkyleneterephthalate resin compositions disclosed herein contain 0.05–4 percent by weight of a sodium salt of a hydrocarbon acid having the formula R°(COO)$_y$Na$_z$ wherein R° is a hydrocarbon group having a valency of y and having 1–25 carbon atoms therein, preferably 1–10 carbon atoms, y is an integer having a value of at least one, advantageously 1–10 and preferably 1–3, and z is an integer having a value of at least one and no greater than the value of y, this sodium salt of the hydrocarbon acid being in the form of a complex with a polymeric compound, which contains at least two recurring units of the formula —CH$_2$CH$_2$O—, together with reinforcing agents, fillers and/or additives and optionally a flow promoter selected from low molecular weight organic esters or polymers containing a recurring structure of [(CH$_2$)$_x$O—]$_m$ wherein x is an integer having a value of no more than 5 and m is an integer having a value ranging from 2, preferably from 200 to about 5,000. The amount of complex is such as to give 0.05 to 4 percent, preferably 0.1–2 percent by weight of sodium carboxylate based on the weight of polyalkyleneterephthalate.

13 Claims, No Drawings

PROCESS FOR THE PREPARATION OF FAST CRYSTALLIZING POLYALKYLENETEREPHTHALATE RESIN COMPOSITIONS

This is a divisional of pending application Ser. No. 540,366, filed Oct. 11, 1983, now abandoned.

BACKGROUND OF THE INVENTION

1. Field of the Invention

The invention relates to the making of fast crystallizing polyalkyleneterephthalate resin compositions useful in molding applications. More particularly, this invention relates to the preparation of fast crystallizing polyalkyleneterephthalate molding compounds containing a complex of a sodium carboxylate and an organic compound such as a polymeric compound containing an ethyleneoxy repeating unit —$CH_2CH_2O$—, together with appropriate reinforcing agents, fillers and/or additives.

2. State of the Prior Art

Polyalkyleneterephthalates have acquired considerable attention as starting materials for the preparation of film, and shaped articles due to their outstanding mechanical and thermal properties. However, polyethyleneterephthalate is known to have a very slow crystallization rate at temperature below 130° C. so that when low molding temperatures and short residence times are employed, the molded article has low crystallinity and poor surface smoothness. The resultant necessity to use high mold temperatures and long residence times has, for a long time, discouraged the use of polyethyleneterephthalates as a molding resin despite its high mechanical and thermal properties.

Polypropyleneterephthalate and polybutyleneterephthalate both have fast crystallization rates, but their crystallization rates and degree of crystallinity still need to be improved, especially for molding very thin parts at low temperatures.

The effectiveness of a crystallization promoter can be studied by measuring the melt and cold crystallization rates of the polyalkyleneterephthalate resin compositions. A much more convenient way is to measure the melt and cold crystallization temperatures of the compositions. Conventionally, the melt crystallization temperature can be determined by following the heat capacity change of the melt in a calorimeter. The maximum of the exotherm during the slow cooling of the melt is taken as the melt crystallization temperature ($T_{mc}$). The maximum of the exotherm during a more rapid heating of an amorphous polyalkyleneterephthalate is taken as the cold crystallizing temperature ($T_{cc}$). To obtain the amorphous or glassy polyalkyleneterephthalate, the resin has first to be completely melted and then quickly quenched, for instance, by dropping the melt into dry ice. It should be noted that both the obtained melt and cold crystallization temperatures depend not only on the history (melt temperatures, annealing, etc.) of the specimen, but also on the heating and cooling rate of the measurement. Thus, for studying the effectiveness of a crystallization promoter, these conditions have to be fixed for purposes of direct comparison. These temperatures are obtainable using a differential scanning calorimeter.

Due to the low heat conductivity of the polymer molding compounds, the inside portion of the resin during molding usually experiences a slower cooling rate than the surface of the molded article. The study of the melt crystallization thus can provide information relating to inside portions, whereas the study of the cold crystallization can provide information relating to the surface of the molded article. A desirable crystallization promoter will substantially increase the melt crystallization temperature and decrease the cold crystallization temperature of polyalkyleneterephthalate resin compositions.

Herwig's U.S. Pat. No. 3,761,450 describes the use of the sodium salt of a polycarboxylic acid as a nucleation agent for polyalkyleneterephthalate. Ibbotson demonstrates that sodium stearate can reduce the cold crystallization temperature of polyethyleneterephthalate (Journal, British Polymer, ii, 146 (1979). United Kingdom Patent Application No. 2,075,032 proposes that the alkali metal salts of a fatty acid can be used as nucleation agents for polyethyleneterephthalate. U.S. Pat. No. 4,352,904 describes sodium or potassium salt of a hydrocarbon acid as a nucleation agent for polyethyleneterephthalate molding compounds. Tonoki's U.S. Pat. No. 4,362,839 teaches the use of alkali metal carboxylates as nucleating agents. Lu's U.S. Pat. No. 4,351,758 teaches the use of alkali metal salts such as the carbonates, bicarbonates, silicate oxides, oxides, etc. as nucleating agents.

Applicant's U.S. Pat. No. 4,365,036 shows as a nucleating agent, a complex formed between NaI and a polyethylene oxide and patent application Ser. No. 420,569, filed Sept. 20, 1983, now U.S. Pat. No. 4,405,741, teaches the use of a complex formed between sodium thiocyanate (NaSCN) and a polyethylene oxide. However, although the use of sodium salts of carboxylic acids are shown in the above-cited prior art references, there is no teaching that polyethylene oxide complexes of sodium carboxylates will be effective as nucleating agents. In fact, it is not known which of the prior art nucleating agents are capable of forming polyethylene oxide complexes and whether such complexes will be superior as nucleating agents as compared to the non-complexed nucleating agent.

SUMMARY OF THE INVENTION

In accordance with the present invention, a polyalkyleneterephthalate molding composition containing the polyethylene oxide-sodium carboxylate complex described herein, has a considerable increase in its melt crystallization temperature and decrease in its cold crystallization temperature as compared with a corresponding composition containing the corresponding sodium carboxylate. Thus, the addition of an effective amount of the crystallization promoter which is a complex of sodium carboxylates and a polymeric compound having the formula [$CH_2CH_2O$—]$_n$, wherein the n is an integer of at least two, improves substantially the crystallization rate of the polyaklyeneterephthalate resin composition. This permits the use of low mold temperatures and short residence times while still providing a shaped article having high crystallinity and a glossy surface. The proportion of sodium carboxylate complex is such as to give 0.05–4 percent, preferably 0.1–2 percent by weight, of sodium carboxylate based on the weight of polyalkyleneterephthalate.

The matrix resin polyalkyleneterephthalate employed herein has the following formula:

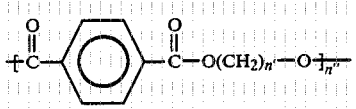

wherein n' is an integer having a value of 2, 3 or 4 and n" is an integer having a value of 50–160 or more, preferably 80–120. This resin can be prepared in a conventional process by esterifying or transesterifying terephthalic acid and/or the corresponding dialkylterephthalate, preferably the dimethyl ester, with about 1.05 to 5.0 moles of alkylene glycol, preferably from 1.4 to 3.0 moles per mole of dicarboxylic acid component in the presence of an esterification and/or a transesterification catalyst. The resulting reaction products are condensed in the presence of a condensation catalyst under reduced pressure (1 torr.), at temperatures of 200° to 320° C. Suitable catalysts for these reactions are described by R. E. Wilfong in *Journal Polym. Sci.*, 54, 385 (1961).

The preferred polyalkyleneterephthalate employed in this invention is polyethyleneterephthalate having an intrinsic viscosity of at least 0.4 dl/g but no more than 1.2 dl/g. The intrinsic viscosity is measured on a solution of phenol and tetrachloroethane in a 2:3 weight ratio, respectively, at 25° C. It is also permissible for the polyethyleneterephthalate to contain minor amounts (about 5 mole percent) of other comonomers such as diethylene glycol or isophthalic acid, etc., substituted for the ethylene glycol or terephthalic acid, respectively. However, large amounts of a comonomer normally will depress the melting temperature and crystallization rate of the polyethyleneterephthalate and, therefore, large amounts of such comonomers are best avoided.

In practicing this invention, it is sometimes desirable to formulate the matrix resin as a block copolymer which contains a considerable amount of the same recurring structural units as in polyethyleneterephthalate, or a polymer blend may be used containing polyethyleneterephthalate for the contribution of desired mechanical and thermal properties of the block copolymer or the polyblend. This may be particularly appropriate where crystallization of the polyethyleneterephthalate is an important factor. In some applications and molding operation, where extremely thin parts and fast molding cycles are employed in conjunction with the use of very low mold temperatures (35° C. or lower), the polybutyleneterephthalate may be a better choice as the matrix resin.

A preferred polybutyleneterephthalate has an intrinsic viscosity of from 0.4 to 2.0 dl/g, preferably from 0.7 to 1.3 dl/g, as measured on an o-chloro-phenol solution of the material at 25° C. It is also suitable that the polybutyleneterephthalate contains minor amounts of a comonomer, that is, by replacing a small portion of the butylene by ethylene or propylene and/or replacing a small portion of the terephthalate with isophthalate. Moreover, it is also suitable to use a polymer blend comprising as a minor ingredient a polymer or a block copolymer having the recurring units of the formula:

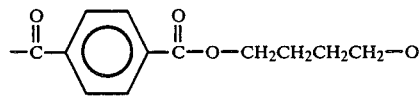

In the present invention the crystallization promoter is a sodium carboxylate complex comprising a sodium carboxylate and a polymer having the formula $[CH_2CH_2O-]_n$ wherein the n is an integer having a value of at least two and up to as high as 36,000, advantageously 70–1600 or more, preferably 70–600. Regardless of the ratio of sodium carboxylate to the polyethyleneoxide derivative, there should be at least 0.05 percent, preferably at least 0.1 percent by weight, of sodium carboxylate per unit weight of polyalkyleneterephthalate. Generally, there is little or no advantage in exceeding 4 percent by weight of sodium carboxylate. A preferred range is 0.1–2 percent by weight of sodium carboxylate.

The organic compounds having a recurring structural unit of $-CH_2CH_2O-$ include a cyclic compound such as the crown ether:

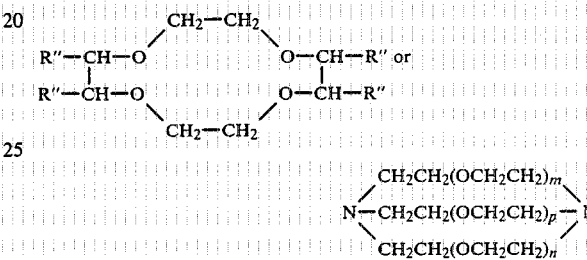

wherein each R" can be individually hydrogen, a hydrocarbyl radical, or a derivative thereof, and m, p and n are each individually an integer of at least 1, preferably 2–20. Suitable derivatives of polyethyleneoxides include an ester end-capped polyether of the formula $R-CH_2CH_2O-_nC(O)R'$ wherein R is hydrogen, a monovalent hydrocarbyl radical including derivatives thereof (containing $-OOCR"$, $-C(O)NR"_2$, $-OR"$), or a multivalent hydrocarboxyl radical, R' is hydrogen, a hydrocarbyl radical or derivatives thereof with a $-OR"$ or $-NR"_2$ radical. R, R' and R" each may have 1–20 carbon atoms, preferably 1–10 carbon atoms.

Typical monovalent R, R' and R" groups suitable in the above formulas include: $-CH_3$, $-C_2H_5$, $C_3H_7$, $-C_4H_9$, $-C_6H_{13}$, $-C_{10}H_{21}$, $-C_{18}H_{37}$, $-C_6H_{11}$, $-C_5H_{10}$, $-C_5H_8CH_3$, $-C_6H_{10}C_2H_5$, $-CH_2C_6H_{11}$, $-CH_2CH_2C_6H_{22}$, $-C_6H_5$, $-C_6H_4CH_3$, $-C_6H_4C_3H_7$, $-C_6H_3(CH_3)_2$, $-C_6H_5OCH_3$, $-C_6H_4OC_2H_5$, $-C_6H_4SCH_3$, $-CF_6H_4OOCCH_3$, $-C_6H_4SO_2C_6H_4CH_3$, $-C_6H_4SO_2C_6H_5$, $-C_6H_3(CH_3)OC_3H_7$, $-C_6H_4OC_6H_4CH_3$, $-C_{10}H_8$, $-C_{10}H_7CH_3$, $-C_{10}H_7C_2H_5$, $-C_{10}H_6(CH3)_2$, $-C_{10}H_6OCH_3$, $-C_{10}H_6OOCCH_3$, $-(C_6H_4)_3C_3H_7$, $-(C_6H_4)_3OC_4H_9$, $-(C_6H_4)_3OC_6H_5$, $-C_6H_4(OCH_2CH_2)_2H$, $-C_6H_4(OCH_2CH_2)_3H$, $-C_6H_4O)_3C_3H_7$, $-CH_2CH_2OCH_2CH_2)_2H$, $-CH_2CH_2(OCH_2CH_2)_3OOCCH_3$, $-CH_2CH_2OC_6H_5$, $-CH_2CH_2OOCCH_3$, $-CH_2CH(CH_3)OOCC_6H_5$, $-C_6H_4COOC_2H_5$, $-CH_2COOC_6H_5$, $-C_6H_4CH=CH_2$, $-C_6H_3(CH_3)CH=CH_2$, $-C_6H_4C(CH_3)=CH_2$, $-C_6HC_4=CH$, etc.

Typical multivalent R groups include $-CH_2CH_2-$, $-CH(CH_3)CH_2-$, $-CH_2CHCH_2-$, $-CH_2CHCH_2CH_2-$, $CH_2CHCHCH_2-$, $-CH_2C_6H_4CH_2-$, $-C_6H_4-$, $-C_6H_4C_6H_4-$, $-C_6H_4OC_6H_4-$, $-C_6H_4SC_6H_4-$, $-C_6H_4SO_2C_6H_4-$, $-C_{10}H_6-$, $-C_{10}H_5-$, $-C_6H_{10}-$, $-CH_2C_6H_{10}-$, —CH$_2$C$_6$H$_{10}$CH$_2$—, —CH$_2$CHCH$_2$—, —CH$_2$CHC$_6$H$_4$—, etc.

The polymeric compounds comprising a recurring structural unit of —CH$_2$CH$_2$O— are literally polyethyleneoxide. In order to increase the thermal stability of the polyethyleneoxide, the polymer may be end-capped by reacting the terminal hydroxyl groups with epoxy, isocyanate or carboxylic acid compounds. There is no lower limit on the molecular weight of the polyethyleneoxide, except that there has to be at least two recurring units as specified above, and the molecular weight of the polyethyleneoxide or related compound can be as high as sixteen million.

The sodium carboxylate used in the present invention is a sodium salt of a hydrocarbon compound containing one or more than one carboxylic acid group per molecule can be used for the preparation of the sodium carboxylate and, subsequently, the complex. The sodium carboxylate is represented by the formula R°(COO)$_y$Na$_z$ wherein R° is a hydrocarbon group having a valency of y and having 1–25 carbon atoms, y is an integer having a value of one, advantageously 1–10 and preferably 1–3, and z is an integer having a value of at least one and no greater than y. The hydrocarbon group is preferably saturated aliphatic but may also be ethyleneically unsaturated aliphatic, cycloaliphatic or aromatic. Typical sodium carboxylates include sodium acetate, sodium propionate, sodium butyrate, sodium hexoate, sodium stearate, mono- and di-sodium maleate, mono- and di-sodium itaconate, mono- and di-sodium phthalate, sodium benzoate, sodium 2-cyclohexyl-acetate, sodium 2-phenyl-acetate, sodium oleate, etc.

The preparation of the complex can be achieved easily by co-dissolving both the ether compound, or polymer, and the sodium carboxylate in a solvent, and then precipitating the complex by evaporating the solvent. An alternate way for preparation of the complex is by co-mixing the sodium carboxylate in the ethyleneoxide-containing compound at temperatures ranging from 50° C. to 200° C., preferably from 80° C. to 150° C. for a period of time between 5 to 60 minutes, preferably 15 to 30 minutes, until a homogeneous liquid state is achieved. The complex is cooled to room temperature for crystallization.

The composition of this invention may be molded at temperatures ranging from 25° C. to 200° C. Polybutyleneterephthalate compositions may be molded in a mold at temperatures as low as 25° C. With polyethyleneterephthalate, molding temperatures of 60° C. or higher are desirable.

The molding compounds may also contain fiber glass as reinforcing agent. All glass fibers available commercially for resin reinforcement may be used. The average length should be at least 0.2 mm, though the fibers can be from about 0.2 to about 10 mm. When the average length is less than 0.2 mm and the proportion of finer glass fibers increases, the mechanical strength, especially impact strength, of molded articles prepared from the resulting composition is reduced extremely and the heat distortion temperature also decreases. The diameter of the glass fibers can be selected from about 8 to 20 microns on an average.

A suitable amount of the glass fiber is from about 5 to 200 parts by weight per 100 parts by weight of the polyethyleneterephthalate. If the amount of the glass fibers is smaller than the specified amount, the heat distortion temperature and surface hardness of a molded article prepared from the resulting resin composition is reduced. If the amount of fiber exceeds the specified amount, the resulting composition is difficult to mold.

The glassfiber may be surface treated with various coupling agents such as silane compound, a titanate compound, an isocyanate compound or an epoxy compound, etc. to increase the adhesion between the matrix resin and the glassfiber. Other reinforcing materials such as carbon fiber and organic fillers may also be used. The plate-like reinforcing agents, such as mica and/or particulate fillers such as clay, wollastonite, calcium carbonate and the like, or combinations thereof, may also be employed. The amounts of these materials employed in making a molding compound varies from 5 to 60% by weight based on the total weight of the compound.

The glassfiber-reinforced thermoplastic polyester composition of this invention may further contain at least one additive selected from the group consisting of coloring agents, fire retardants, ultraviolet absorbers, anti-oxidants, lubricants, coloration inhibitors, fillers and antistatic agents.

To impart strength, color or particular surface properties, a variety of fillers may be added to the composition of this invention, including, but not by way of limitation; for strength: fiberglass, wollastonite, graphite, mica, organic fibers such as polyaromatic amide fibers; for lubrication: polytetraflouroethylene, paraffin or sodium stearate. The examples which follow illustrate further types of additives which are suitable in the practice of this invention.

Examples of suitable coloring agents are dyes such as azo types and anthraquinone dyes, organic pigments such as azo pigments, phthalocyanine pigments and quinacridone pigments and inorganic pigments such as titanium oxide, carbon black, red iron oxide and cadmium sulfide. The appropriate amount of coloring agent may be determined experimentally. For example, it is generally about 0.01 to about 5% by weight, preferably about 0.05 to about 2% by weight, based on the weight of polyalkyleneterephthalate.

Examples of suitable fire retardants include halogen-containing compounds such as brominated biphenyl ether, polycarbonate produced from ring-brominated products of bisphenol A, elemental phosphorus, phosphorus compounds such as triphenyl phosphate, and compounds havig a phosphorus-nitrogen bond such as phosphoramide. The appropriate amount of the fire retardant may be determined experimentally. For example, it is generally about 0.5 to about 50% by weight, preferably about 3 to about 25% by weight, based on the weight of polyalkyleneterephthalate.

Examples of suitable ultraviolet absorbers include benzophenone compounds such as 2-hydroxy-4-methoxybenzophenone, benzotriazole compounds such as (2-hydroxy-5-methylphenyl) benzotriazole, and salicylate compounds such as phenyl salicylate. The appropriate amount of the ultraviolet absorber may be determined experimentally. For example, it is generally about 0.01 to about 2% by weight, preferably about 0.05 to about 1% by weight, based on the weight of the polyalkyleneterephthalate.

Examples of suitable antioxidants include hindered phenol compounds such as 2,4,6-tri-tert-butyl phenol, sulfur-contaning compounds such as dilauryl thiodipropionate, and amine compounds such as phenyl-d-napthylamine. The appropriate amount of the antioxidant may be determined experimentally. For example, it is generally about 0.0 to about 2% by weight, preferably about 0.05 to about 1% by weight, based on the weight of polyalkyleneterephthalate.

Examples of suitable lubricants include paraffin waxes such as liquid paraffin, fatty acids such as palmitic acid, fatty acid esters such as butyl stearate, and fatty acid metal salts such as sodium stearate and polytetrafluoro ethylene powder. The amount of lubricant may be determined experimentally. For example, it is generally about 0.01 to about 2% by weight, preferably about 0.05 to about 1% by weight, based on the weight of the polyester.

Examples of suitable antistatic agents include cationic surface active agents such as stearamidopropyl dimethyl-$\mu$-hydroxymethyl ammonium nitrate, anionic surface active agents such as alkylaryl sulfates, and nonionic surface active agents such as polyethylene oxide. The amount of the antistatic agent may be determined experimentally. For example, it is generally about 0.01 to about 5% by weight, preferably about 0.05 to about 2% by weight, based on the weight of the polyalkyleneterephthalate.

In order to improve the flow property of the thermoplastic molding compound, a selected plasticizer may also be added. The lowering of torque during extrusion due to the improvement of flow by the plasticizer has been known in the art of thermoplastic technology.

When a plasticizer is added in the practice of this invention, the amount ranges from about 0.5 to about 3% by weight percent (based on the weight of polyalkyleneterephthalate). The plasticizer may be an organic ester, or a polyether containing block copolymer repeating units. The organic ester may be an aliphatic or aromatic ester product of an aromatic or aliphatic carboxylic acid of 1 to 36 carbon atoms and an alcohol of 7 to 20 carbon atoms. Commercially available plasticizers of this kind are, for instance, Benzoflex S312, a neopentylglycoldibenzoate; Benzoflex 9-88; a dipropylene glycol dibenzoate and Loxiol G30, a mono fatty acid ester, etc.

The polyether plasticizer containing block copolymer may be a reaction product of

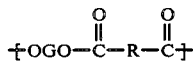

and

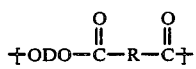

polymers, wherein G is a divalent radical remaining after removal of terminal hydroxy groups from poly-(alkylene oxide) glycol having a molecular weight of about 200 to 5,000, in which the alkylene group advantageously has 2–10, preferably 2–4 carbon atoms, R is a divalent radical, remaining after removal of carboxyl groups from a dicarboxylic acid, having a molecular weight in the range of about 96 to about 300, and D is a divalent radical, remaining after removal of hydroxyl groups from a low molecular weight diol, having a molecular weight of about 62 to 250.

The making of block copolyester ethers of this kind has been described in U.S. Pat. Nos. 3,663,653, 3,775,373 and 3,801,547. A commercially available copolymer of this kind is a thermoplastic elastomer sold by Du Pont under the trademark "HYTREL".

Suitable polyalkyleneterephthalate compounds are prepared using the appropriate ingredients containing as little moisture as possible preferably less than 0.01%. The desired ingredients are premixed, dried at temperatures ranging from 80° C. and 150° C. and then coextruded at temperatures ranging from 240° to 290° C., preferably from 260° to 270° C.

SPECIFIC EMBODIMENTS OF THE INVENTION

The invention is illustrated by the following examples which are intended merely for purpose of illustration and are not to be regarded as limiting the scope of the invention or the manner in which it may be practiced. Unless specifically indicated otherwise, parts and percentages are given by weight. The materials used for these experiments are as follows and are identified as indicated below:

Sodium acetate (Na Acet.) is purchased from F. T. Baker Chemical Company. It is a "Baker Analyzed" reagent grade product.

Sodium propionate (Na Prop.) is purchased from Pfatz and Bauer, Inc. It is a reagent grade product.

Sodium stearate (Na Stear.) is purchased from Mallinckrodt Chemical Works.

PEO is polyethyleneoxide, as sold by Polyscience Corporation. It has a molecular weight of 18,000.

The sodium acetate/PEO complex is prepared by mixing 8.203 grams of sodium acetate with 8.8 grams of PEO at 70° C. for 30 minutes, then it is cooled to room temperature for crystallization.

The sodium propionate/PEO complex is prepared by mixing of 9.61 grams of sodium propionate with 8.8 grams of PEO at 80° C. for 15 min., and then it is cooled to room temperature for crystallization.

The sodium stearate/PEO complex is prepared by mixing 30.6 grams of sodium stearate with 30.8 grams of PEO at 80° C. for 15 minutes, and then it is cooled to room temperature for crystallization.

PET is the polyethyleneterephthalate, Cleartuf 7202 which is sold by Goodyear Corporation. It has an intrinsic viscosity of 0.72 as measured in a solution mixture of phenol/tetrachloroethane (40/60 wt.) at 25° C.

Fiberglass: Type 3540 sold by PPG Industries, Inc. The nominal fiber diameter is 0.00038 inch and the length is ⅛ inch.

EXAMPLES 1–13

A series of polyethyleneterephthalate molding compositions are prepared respectively by pre-drying all ingredients at 90° C. in a vacuum oven for about 16 hours. The moisture content of these compositions before extrusion is between 0.008% and 0.006%. All these compositions contain, in addition to 70% polyethyleneterephthalate, 30% fiber glass, the nucleation agent, a constant amount (1.05% based on total weight of PET and fiber glass) of flow promoter (polyethyleneoxide).

Each of the compositions is extruded at 265°–250°–245° C. barrel temperatures, using ¾" screw extruder operating at 60 rpm. The extrudates are pelletized and specimens for crystallization study are kept in sealed containers.

The crystallization temperatures are studied using Perkin-Elmer DSC equipment. The melt crystallization temperature (Tmc) is taken by first heating a pellet to 540° K using a 40° K/minute heating rate, holding at 540° K for 2 minutes, then cooling at 5° K/minute rate in DSC. The cold crystallization temperature (Tcc) is obtained by heating a quenched pellet at 20° K/minute in the DSC. The amorphous PET compositions are prepared by heating the PET pellet to 540° K, keeping at this temperature for 2 minutes, then quickly quenching it in ice water.

The results of the crystallization studies are summarized in Table 1.

TABLE 1

Effect of Nucleation Agents on Crystallization Temperatures

| Exp. No. | Total Flow Promoter (%)* | Nucleation Agent | Inorganic Salt (%)** | $T_{cc}$ K | $T_{mc}$ K |
|---|---|---|---|---|---|
| 1 | 1.05 | 0 | 0 | 423 | 489 |
| 2 | 1.05 | Na Acet. | 0.24 | 403 | 494 |
| 3 | 1.05 | Na Acet.-PEO Complex | 0.24 | 398 | 498 |
| 4 | 1.05 | Na Acet. | 0.36 | 397 | 495 |
| 5 | 1.05 | Na Acet.-PEO Complex | 0.36 | 395 | 497 |
| 6 | 1.05 | Na Prop. | 0.50 | 393 | 497 |
| 7 | 1.05 | Na Prop.-PEO Complex | 0.50 | 385 | 499 |
| 8 | 1.05 | Na Prop. | 0.75 | 392 | 499 |
| 9 | 1.05 | Na Prop.-PEO Complex | 0.75 | 382 | 500 |
| 10 | 1.05 | Na Stear. | 0.50 | 400 | 496 |
| 11 | 1.05 | Na Stear.-PEO Complex | 0.50 | 393 | 496 |
| 12 | 1.05 | Na Stear. | 1.00 | 396 | 498 |
| 13 | 1.05 | Na Stear.-PEO Complex | 1.00 | 391 | 498 |

*The promoter is polyethylene oxide (PEO) and the percentage reported is calculated on the total amount, including that also in the complex, based on the total weight of the resin composition.
**The percentage of inorganic salt is calculated on the basis of the total PET in the composition.

With sodium acetate and sodium propionate the complex shows notable improvement with respect to $T_{cc}$ and $T_{mc}$ as compared to the use of the salt alone. With sodium stearate the complex shows decided improvement with respect to $T_{cc}$ but no effect with respect to $T_{mc}$.

While certain features of this invention have been described in detail with respect to various embodiments thereof, it will of course be apparent that other modifications can be made within the spirit and scope of this invention, and it is not intended to limit the invention to the exact details insofar as they are defined in the following claims.

What is claimed is:

1. The process of preparing a fast crystallizing molding composition comprising the steps of:
   (a) preparing a preformed complex of a sodium carboxylate selected from the group consisting of sodium acetate and sodium propionate and a polymeric compound having at least two recurring units of the formula —CH$_2$CH$_2$O— by dissolving the sodium carboxylate and the said polymeric compound in a solvent and thereafter evaporating the solvent from the resultant complex or by co-mixing the sodium carboxylate in the said polymeric compound at a temperature of 50°–200° C. for 5–60 minutes until a homogeneous liquid state is achieved,
   (b) adding said preformed complex to a polyalkyleneterephthalate in which the alkylene group has 2–4 carbon atoms, the amount of added complex being enough to give a proportion of 0.05–4 percent by weight of sodium carboxylate, based on the weight of said polyalkyleneterephthalate, and
   (c) effecting intimate mixture of said complex and said polyalkyleneterephthalate.

2. The process of claim 1, in which there is also present in the polyalkyleneterephthalate 5–60 percent by weight of at least one modifier selected from the class consisting of reinforcing and filling materials, said weight percentage being based on the total weight of the composition.

3. The process of claim 2, wherein said polyalkyleneterephthalate is polyethyleneterephthalate has an intrinsic viscosity of at least 0.4 dl/g as measured on a 2:3 by weight mixture, respectively, of phenol and tetrachloroethane at 25° C.

4. The process of claim 2, wherein said polyalkyleneterephthalate is polybutyleneterephthalate has an intrinsic viscosity of at least 0.5 as measured on an o-chlorophenol solution at 25° C.

5. The process of claim 2, wherein said polyalkyleneterephthalate the polyalkyleneterephthalate is a block copolymer containing at least 30% by weight of the polyalkyleneterephthalate recurring units.

6. The process of claim 2, wherein said polyalkyleneterephthalate is a block copolymer of at least 30% polyethyleneterephthalate.

7. The process of claim 2, wherein said polyalkyleneterephthalate is a block copolymer having at least 50% polybutyleneterephthalate.

8. The process of claim 1, wherein the said polymeric compound has at least 20 of said recurring units.

9. The process of claim 1, wherein the amount of said sodium carboxylate complex is sufficient to give 0.05–4 percent by weight of sodium carboxylate based on the weight of said polyalkyleneterephthlate.

10. The process of claim 1, wherein there is also present in the polyalkyleneterephthalate 0.5 to 60 percent by weight of a reinforcing material selected from the group consisting of glass fibers, glass beads, graphite, carbon fibers, mica, wollastonite and polyaromatic amide fibers.

11. The process of claim 1, wherein there is also present in the polyalkyleneterephthalate 0.5 to 10 percent by weight of a flow promoter, which is selected from the group consisting of paraffin, polytetrafluoroethylene and polyethyleneoxide.

12. The process of claim 1, wherein there is also present in the polyalkyleneterephthalate 0.5 to 15 percent by weight of a plasticizer selected from the group consisting of a block copolyester ether, dibenzoate of neopentyl glycol, dibenzoate of dipropylene glycol, and a monoester of a fatty acid containing 1 to 32 carbon atoms.

13. The process of claim 1, wherein the amount of said sodium carboxylate complex is sufficient to give 0.1–2 percent by weight of sodium carboxylate based on the weight of said polyalkyleneterephthalate.

* * * * *

UNITED STATES PATENT AND TRADEMARK OFFICE
CERTIFICATE OF CORRECTION

PATENT NO. : 4,558,085
DATED : Dec. 10, 1985
INVENTOR(S) : Chung J. Lee

It is certified that error appears in the above-identified patent and that said Letters Patent is hereby corrected as shown below:

Col. 10, lines 18 and 23, in both instances change "has" to read ---having---.

Signed and Sealed this

Fourth Day of March 1986

[SEAL]

Attest:

Attesting Officer

DONALD J. QUIGG

Commissioner of Patents and Trademarks